United States Patent Office 2,820,733
Patented Jan. 21, 1958

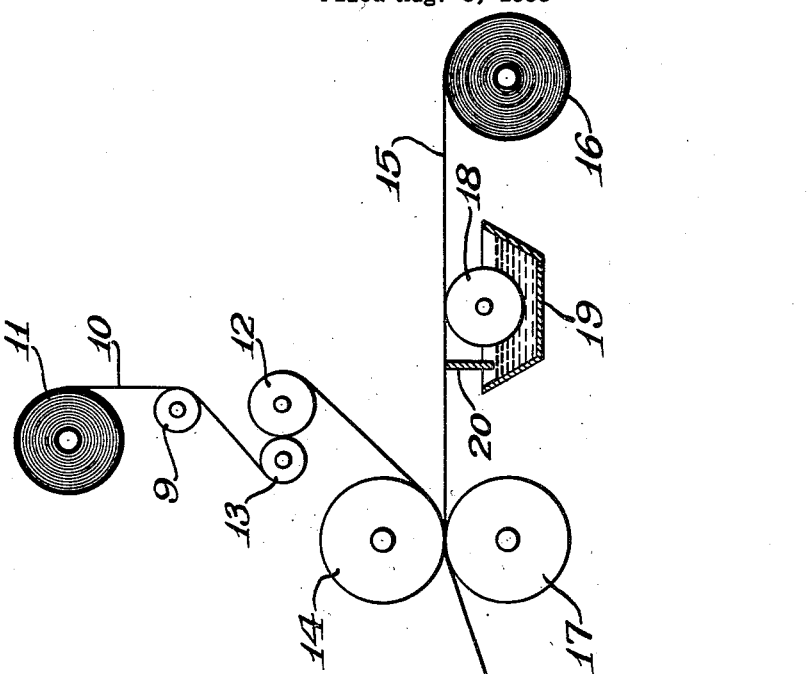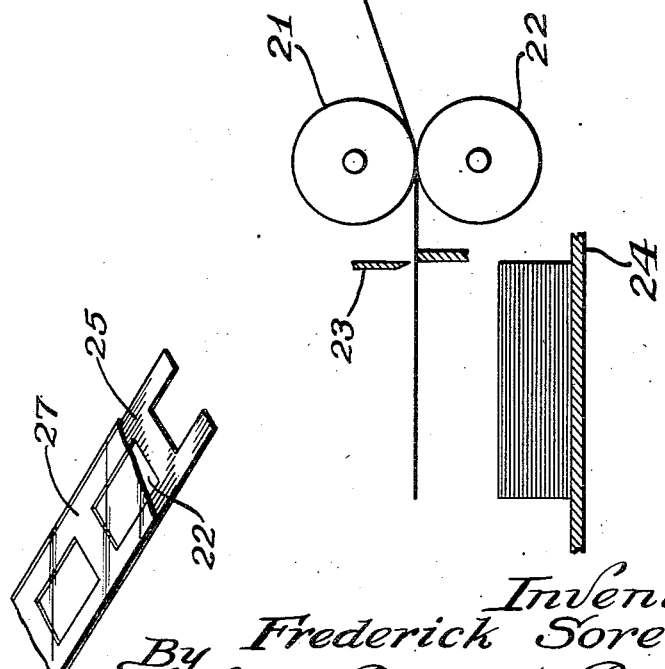

2,820,733

PRODUCTION OF STRETCHED LAMINATES

Frederick Sorel, Chicago, Ill., assignor to Arvey Corporation, Chicago, Ill., a corporation of Illinois Application August 6, 1956, Serial No. 602,123

2 Claims. (Cl. 154—118)

This invention relates to the production of stable laminates composed of thermo-elastic film material in heat stretched condition with unstretched or non-heat stretched sheet material retained dimensionally stable in the process, and more particularly to laminates of Pliofilm, i. e., rubber hydrochloride and, for example, a paper or paperboard backing suitable for the production of protectively covered printed material or packaging material, in a rapid and economical manner.

Pliofilm is conventionally prepared by casting methods, and it is known to subsequently stretch it, with or without the aid of heating, for various reasons, including reduction in film thickness, with the resulting enhanced clarity, economy of material, greater flexibility, shock resistance, and tensile strength.

It is also known to laminate a plurality of plies of Pliofilm, either of the plasticized or unplasticized variety, to each other with the aid of heating and stretching, such laminates having a residual inherent shrinkability considered desirable for some purposes but undesirable for others.

It has also been proposed to laminate a sheet of Pliofilm in heated and stretched condition to a relatively non-expandable material, and in order to prevent it from curling, it was necessary to wind and store it up in rolls for several hours and permit it to temper before use in an attempt to stabilize it. Even so, such treatment has heretofore been unsuccessful in the production of laminates composed of imperforate sheets of stretched Pliofilm and coextensive perforate sheets of nonextendable material such as is required in the production of transparent window packages and cartons, since it has been found that despite all rolling up and storing, as heretofore proposed, curling and pealing at the window area takes place.

Pliofilm is desirable as a surface or protective film because of its grease-proofing qualities, freedom from pin holes and high bursting and tensile strength when oriented by stretching, in addition to having good heat sealing properties to itself.

It is therefore an object of the present invention to provide improved laminate composed of at least one ply of stretchable Pliofilm in stabilized condition and at least one ply of relatively nonextendable or dimensionally stable material, all in a novel and economical manner, which substantially eliminates tendency toward delamination and necessity for rolling and storing in such rolled condition, but rather enables the production of laminates in continuously cut-off separate strips, with cut-off taking place adjacent the point of lamination.

The present invention further enables the production of laminated sheet material of the transparent "window" type in the same rapid and economical manner and without the tendency for pealing, curling or separating at the window areas even though the Pliofilm has been appreciably stretched, that is, for example, greater than 4.75 to 1.

Other objects of the present invention, its details and economies thereof will be explained in the accompanying diagrammatic drawings, wherein:

Fig. 1 schematically presents the process for forming the novel laminate.

Fig. 2 is a perspective fragmentary view with parts broken away, with the laminate formed in accordance with the present invention.

Referring to the drawings, and particularly to Fig. 1, a sheet of Pliofilm 10 is drawn from the let-off or supply roll 11 by means of rubber covered driven governor roll 12, over idler roll 9 and the steel nip forming roll 13. It then passes around and in contact with an appreciable portion, such as about 45°, of the surface of driven laminating roll 14 which may have a diameter of about twelve inches. This laminating roll is suitably covered with paper, Teflon, or other material to prevent sticking of the Pliofilm thereto in heated condition, the roll 14 being heated by means of steam, electrical resistance or otherwise to a controlled temperature so as to heat the Pliofilm 10 as it passes thereabout to a temperature of at least 230° F. to an upper limit of about 245° F.

The laminating roll 14 and the governor roll 12 are driven at differential surface speeds so that the Pliofilm passing between them will be stretched to a ratio of at least 4.75 to 1, and thus elongated by at least 475%, and as high as 8 to 1 or even higher, consistent with the plasticized character of the material being stretched. A sheet of material such as a paper web 15 is drawn from the let-off or supply roll 16 by means of the lower unheated steel laminating roll 17 which, although undriven, rolls at the same surface speed as driven roll 14 through friction resulting from the pressure of roll 14 and the materials being drawn and laminated through the nip of said rolls. In its passage thereto, one surface of the paper web is coated with a laminating cement such as wax, resin, rubber or combinations thereof or other adhesive by means of the roller 18 in the supply pan 19 controlled by the doctor blade 20. After the two sheets 10 and 15 are joined by the pressure of laminating rolls 14 and 17 they pass beneath the roll 21 which is cooled as by means of circulating water and drawn by the juxtaposed roll 22 and passed beneath the cut-off knife 23 and permitted to drop freely to the supporting table or the like 24.

Fig. 2 diagrammatically shows an apertured laminate suitable for the production of window boxes or bags comprised of the paperboard base ply 25 formed with apertures 26 to which is laminated a film of stretched Pliofilm 27.

The determining factors of the stability of the products by the present process are the correlation and employment of the minimum laminating temperature and surface speed ratio of the governor to the laminating roll; that is to say, a minimum of stretch of 4.75 to 1 and a minimum temperature of 230° F. have been found to be critical to produce laminates wherein the Pliofilm has lost its "plastic memory" and no longer has perceptible "spring back" as is evident at temperatures below 230° F. when stretching to a greater or lesser degree than 4.75 to 1, and as is the case when employing said temperature of 230° F. or higher when stretch is less than 4.75 to 1. In other words, although I may employ a stretch of greater than 4.75 to 1 and temperatures in excess of 230° F., the results are not commercially attainable when going below either the aforesaid minimums. This holds true with varying degrees of plasticization and varying thicknesses of starting material.

It will thus be understood that I have found that such thicknesses of Pliofilm as 75 and 140 gauge respond equally to the limits of the aforesaid invention. MW 140 gauge material has a thickness of 1.4 mils, has an area of 17,000 square inches per pound, and is composed of a copolymer of rubber hydrochloride with a minor amount of butadiene-acrylonitrile rubber, but is still considered Pliofilm. I have also found that the N2 or least plasticized grade is suitable, as is also P4½ grade which is medium to highly plasticized. Another suitable externally plasticized grade is designated BF.

The base material to which the Pliofilm is laminated may be paper, paperboard, glassine, cellophane, or even certain plastics such as cellulose acetate, polyester films and the like, adapted for ornamental coverings or packaging materials for food and other products and which remain dimensionally stable during the operation since the base sheet is not heated or stretched during passage over cold roll 17.

It has been also unexpectedly found, in accordance with the present invention, that when the governor roll 12 and the laminating roll 14 are set at a fixed surface speed ratio of, for example, 1 to 4.75 that when the joint speeds of said rolls are accelerated, even though the ratio between these two rolls is maintained, greater than the expected 4.75% stretch occurs, this stretch being then set into the Pliofilm web 10 as it passes around the heated laminating roll 14, which degree of stretch is also to some extent enhanced by increase of temperature within the limits specified.

The following are examples of the stretch actually obtained with the illustrated arrangement of apparatus when laminating the indicated grades of Pliofilm to apertured flexible paperboard at a fixed speed ratio between governor roll 12 and laminating roll 14 of 1 to 4.75, with the surface of the latter at temperatures of 230° F. at running speeds of 50 and 100 feet per minute, respectively, while maintaining a constant tension at let-off roll 11, showing the dependence of actually obtained stretch on the laminating speed.

| Pliofilm grade | Laminating speed, feet per minute | Stretch obtained, percent |
| --- | --- | --- |
| 140 gauge MW | 50 | 475 |
| Do | 100 | 600 |
| 140 gauge N2 | 50 | 475 |
| Do | 100 | 570 |
| 140 gauge P4½ | 50 | 470 |
| Do | 100 | 560 |
| 75 gauge BF | 50 | 500 |
| Do | 100 | 560 |

From the foregoing it would appear that there are flow properties inherent to Pliofilm in general that seem to be related to a thixotropic behavior found in various polymers, and that there is thus decreased internal friction under the influence of motion.

It is to be further noted that the stretch at temperatures of 230° F. and above exceeds by far the elongation at break of Pliofilm at room temperature and although some cold stretch may occur in my process, the major amount of the stretching occurs in contact with the heated laminating roll, the Pliofilm being thermo-elastic. By heating to at least 230° F. and stretching at least 4.75 to 1, the Pliofilm may be elongated until it gets too soft and breaks, such upper temperature being about 245° F. with elongation in some cases as high as 20 to 1. It is preferred, however, to stretch from 4.75-to-1 to 8-to-1 at temperatures of at least 230° F. to 240° F.

I claim as my invention:

1. A stable laminated product comprising a film of plasticized normally thermo-elastic rubber hydrochloride bonded in a from 230 to 245° F. heat softened and from at least 475% to about 800% stretched condition to a ply of flexible relatively nonextendable apertured felted fibrous sheet material.

2. The process of producing a stabilized noncurling laminate of plasticized thermo-elastic rubber hydrochloride film material in thermo-stretched condition and a nonextendable ply of flexible apertured felted fibrous sheet material, which comprises bonding said materials together between a pair of oppositely rotating surfaces one of which is heated to a temperature of from at least 230° F. to about 245° F. and stretching said rubber hydrochloride film material, in appreciable surface contact with said heat surface by at least 475%, and then cooling the resulting composite to a lower temperature upon emergence from between said rotating surfaces and promptly severing it to flat unrestricted units of predetermined length.

References Cited in the file of this patent
UNITED STATES PATENTS

| | | |
| --- | --- | --- |
| 2,511,303 | Stevens et al. | June 13, 1950 |
| 2,740,741 | Vaughan et al. | Apr. 3, 1956 |
| 2,740,742 | Vaughan | Apr. 3, 1956 |

UNITED STATES PATENT OFFICE
CERTIFICATE OF CORRECTION

Patent No. 2,820,733 January 21, 1958

Frederick Sorel

It is hereby certified that error appears in the above numbered patent requiring correction and that the said Letters Patent should read as corrected below.

In the grant, lines 2 and 3, for "Arvey Corporation, of Chicago, Illinois, a corporation of Illinois" read -- Arvey Corporation, of Chicago, Illinois, a corporation of Delaware -; in the heading to the printed specification, lines 3 and 4, for "Arvey Corporation, Chicago, Ill., a corporation of Illinois" read -- Arvey Corporation, Chicago, Ill., a corporation of Delaware.

Signed and sealed this 1st day of April 1958.

(SEAL)

Attest:

KARL H. AXLINE
Attesting Officer

ROBERT C. WATSON
Commissioner of Patents